(12) United States Patent
Farnes et al.

(10) Patent No.: US 10,203,052 B2
(45) Date of Patent: Feb. 12, 2019

(54) FLEXIBLE PIPE CARCASS FOR CONTROLLING FLOW INDUCED VIBRATION IN A RISER

(75) Inventors: Knut-Aril Farnes, Trondheim (NO); Bjørn Melve, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 615 days.

(21) Appl. No.: 14/411,213

(22) PCT Filed: Jun. 29, 2012

(86) PCT No.: PCT/EP2012/062735
§ 371 (c)(1),
(2), (4) Date: May 12, 2015

(87) PCT Pub. No.: WO2014/000816
PCT Pub. Date: Jan. 3, 2014

(65) Prior Publication Data
US 2015/0252920 A1  Sep. 10, 2015

(51) Int. Cl.
*F16L 11/16* (2006.01)
*F16L 11/08* (2006.01)
(Continued)

(52) U.S. Cl.
CPC ............ *F16L 11/16* (2013.01); *B21C 37/121* (2013.01); *B21C 37/124* (2013.01);
(Continued)

(58) Field of Classification Search
CPC .............................. F16L 11/16; B21C 37/121
(Continued)

(56) References Cited

U.S. PATENT DOCUMENTS

| 846,996 A | 3/1907 | Greenfield |
| 4,567,916 A | 2/1986 | Antal et al. |

(Continued)

FOREIGN PATENT DOCUMENTS

| CN | 102292556 A | 12/2011 |
| CN | 102352947 A | 2/2012 |

(Continued)

OTHER PUBLICATIONS

Mar. 17, 2016—(CN) Office Action—App 201280074402.5—Eng Tran.

(Continued)

*Primary Examiner* — Craig Schneider
*Assistant Examiner* — David Deal
(74) *Attorney, Agent, or Firm* — Banner & Witcoff, Ltd.

(57) ABSTRACT

The invention relates to a flexible pipe carcass comprising a flexible tubular wall structure comprising a helically wound wall strip; wherein interlocking sections of successive windings of said wall strip form the wall structure. The interlocking sections of adjacent wall strips define a length and are movable with respect to each other between a first position and a second, extended position for changing said length, the interlocking sections being formed such that in the extended position a carcass gap is provided between adjacent interlocking sections for accommodating relative movement there between upon flexure of the wall structure. An insert profile is located in the carcass gap of the tubular wall structure on an inside of the wall structure to at least partly cover the carcass gap.

17 Claims, 9 Drawing Sheets

(51) Int. Cl.
*B21C 37/12* (2006.01)
*F16L 11/24* (2006.01)
*E21B 17/01* (2006.01)

(52) U.S. Cl.
CPC .......... *B21C 37/126* (2013.01); *F16L 11/083* (2013.01); *F16L 11/24* (2013.01); *E21B 17/01* (2013.01)

(58) Field of Classification Search
USPC .................................... 138/134, 135, 136
See application file for complete search history.

(56) References Cited

U.S. PATENT DOCUMENTS

| | | | |
|---|---|---|---|
| 6,039,083 | A | 3/2000 | Loper |
| 6,085,798 | A * | 7/2000 | Le Nouveau ......... F16L 11/081 138/125 |
| 6,360,781 | B1 | 3/2002 | Braad |
| 6,382,681 | B1 | 5/2002 | Berton et al. |
| 7,318,454 | B2 | 1/2008 | Dupoiron |
| 2002/0195157 | A1 | 12/2002 | Foti et al. |
| 2003/0070719 | A1* | 4/2003 | Espinasse ............... F16L 11/08 138/109 |
| 2004/0066035 | A1 | 4/2004 | Buon |
| 2009/0223586 | A1 | 9/2009 | Vo |
| 2009/0308478 | A1 | 12/2009 | Vo |
| 2011/0247698 | A1 | 10/2011 | Karabelas et al. |

FOREIGN PATENT DOCUMENTS

| | | |
|---|---|---|
| EP | 0148061 A1 | 7/1985 |
| WO | 0181810 A1 | 11/2001 |
| WO | 2011050810 A1 | 5/2011 |
| WO | 2011073687 A1 | 6/2011 |

OTHER PUBLICATIONS

International Search Report and Written Opinion dated Feb. 4, 2013 (PCT/EP2012/062735); ISA/EP.
R.Swindell, S. Belfroid: "Internal Flow Induced Pulsation of Flexible Risers", OTC, May 3, 2007 (May 3, 2007), XP009166356, Offshore Technology Conference DOI: 10.4043/18895-MS, ISBN: 978-1-55563-254-0, the whole document.

* cited by examiner

FLEXIBLE PIPE CARCASS FOR CONTROLLING FLOW INDUCED VIBRATION IN A RISER

CROSS-REFERENCE TO RELATED APPLICATIONS

The present application is a U.S. National Phase of International Application No. PCT/EP2012/062735, filed on Jun. 29, 2012 and designating the United States of America. This application claims the benefit of the above-identified application which is incorporated by reference herein in its entirety.

TECHNICAL FIELD

The present invention relates to method and an arrangement for controlling and mitigating flow induced vibration occurring internally in a flexible pipe.

BACKGROUND ART

A flexible pipe is made from a composite pipe structure with cross-sectional layers of polymers and steel that can accommodate large curvatures. Flexible pipe is used in a variety of applications including topside jumpers, flow-lines and, most importantly, risers.

Conduits to transfer materials from the seafloor to production and drilling facilities at the surface, as well as from the facility to the seafloor, are commonly termed risers. Risers are a type of pipe developed for this type of vertical transportation. Risers can serve as production or import/export means and are the connection between the subsea field developments and production and drilling facilities. Similar to pipelines or flow lines, risers transport produced hydrocarbons, as well as production materials, such as injection fluids, control fluids and gas lift. Risers can be made from steel pipes or flexible pipes.

Flexible risers made from flexible pipe can sustain large vertical and horizontal movement of the top end, making them ideal for use with floating facilities.

In general, a flexible pipe comprises a central steel carcass covered by a pressure sheath providing hydraulic integrity. Numerous layers of flexible armour surround the pressure sheath, or pressure vault, to provide tensile- and hoop-stress strength. The armour layers are usually separated by cushioning layers of composite or thermoplastic material to prevent them from rubbing against one another. The number and size of armour layers are a function of the pressure and tensile strength specifications imposed by the particular application for which the riser is designed. A final thermoplastic outer sheath provides protection towards the external environment.

A problem with some types of flexible pipes are that the internal carcass has a profile that can cause flow induced vibration or flow induced pulsations (FIP), commonly termed "singing", inside the pipe.

This problem has been observed on floating production platforms that export or inject gas through flexible risers. As the gas flow is increased, high levels of distinctive tonal noise and vibration occur in the flexible pipe. These pulsations are generated by lock-in of synchronized vortex shedding in the groves on the inner corrugated layer (carcass) of the flexible pipe. When the vortex shedding frequency is close to the natural frequencies of topside piping or subsea manifolds, resonance can cause excessive vibration and noise levels in the topside and subsea piping. On-set of vibrations happen for gas flow velocities as low as 1.5 m/s. As the flow rate is limited by the first onset velocity, production capacity may be severely limited. This problem is discussed in, for instance, "Internal Flow Induced Pulsation of Flexible Risers" by R. Swindell, Bureau Veritas, and S. Belfroid, TNO TPD; 2007 Offshore Technology Conference, Houston. Tex., U.S.A.

Such vibrations have been suppressed by controlling the velocity of the gas, using smooth bore pipes or introducing silencers at the topside.

However, such solutions have drawbacks. Limiting the gas velocity will inherently limit the capacity of the pipe. Limiting the capacity of the gas export pipes has economic consequences and combined with limitation in gas injection pipes may result in reduced production capacity on the facility. Smooth bore pipes with a large inner diameter need special manufacturing techniques and have a more complex cross sectional structure, in which extra layers in the wall increase the wall thickness and limit the maximum diameter that can be produced.

An example of a riser comprising an inner layer or liner is known from U.S. Pat. No. 7,318,454, which describes a flexible tubular pipe for transporting fluids, particularly gaseous hydrocarbons, the pipe being of the non-bonded type and comprising at least a carcass, a polymer internal sealing sheath providing sealing for the transported fluid and one or more armour layers and in which the carcass, situated inside the internal sealing sheath consists of the interlocked spiral winding of a profiled element. The turns of the carcass are internally covered with a sheath pierced with holes that is intended to oppose turbulence of the fluid flowing in the pipe.

A problem with this solution is that the continuous inner sheath will impede the movement of the carcass and reduce the flexibility of the flexible riser, as it counteracts free relative movement of the interlocked carcass segments.

Silencers are large and heavy structures that need careful design to work and may have limited fatigue life. There is a significant risk that the silencer will not work properly for a given pipe. Silencers are costly and need a significant topside capacity.

Hence, there is a need for an arrangement that avoids the above problems. The object of the invention is to provide an improved flexible pipe carcass arrangement that will eliminate, or at least considerably reduce problems relating to flow induced vibration.

DISCLOSURE OF INVENTION

The above problems are solved by an arrangement and a method as described in the attached claims.

In the subsequent text, terms such as inner, outer, radial and axial are used to define directions in relation to the central longitudinal axis of a flexible pipe carcass The invention relates to a flexible pipe carcass comprising a flexible tubular wall structure. The tubular wall structure comprises a helically wound S-shaped wall profile formed from a metal strip to interlocking sections of successive windings of said wall profile into the carcass wall structure. Such interlocking sections are well known in the art and will not be described in further detail.

The adjacent interlocking sections are movable with respect to each other in the axial direction of the carcass. The interlocking sections are movable between a first, compressed position and a second, fully extended position. The changes of positions of adjacent carcass profiles allow the carcass to bend and extend/compress in axial length.

An intermediate position, where the carcass has a nominal length and is substantially straight, is located between the first and second positions. The interlocking sections are formed such that as the carcass sections are moved from the fully compressed position toward the fully extended position a gap, termed a carcass gap, is provided between adjacent interlocking sections for accommodating the relative movement.

The invention aims to provide a solution for suppressing the on-set of singing in flexible pipes with a central corrugated carcass. As described above, the pulsations generating the singing are generated by lock-in of synchronized vortex shedding in the grooves on the inner corrugated carcass of the flexible pipe. When the vortex shedding frequency is close to the natural frequencies of topside piping or subsea manifolds, resonance can cause excessive vibration and noise levels in the topside and subsea piping.

The solution involves the insertion of a profile into the carcass gap, which profile fully or partially covers the gap. In the subsequent text, the terms "profile" or "insert profile" will be used for this component. After production of the pipe and during normal operation thereof, the carcass sections will usually have carcass gaps close to a nominal relative position of the carcass sections. The nominal position is located approximately half way between the respective maximum extended and maximum compressed positions of the carcass. Preferably, the profile will substantially cover the carcass gap when adjacent carcass sections are in the nominal position. However, even if the carcass is moved to its maximum extension, the profile will cover a sufficient portion of the gap to prevent or inhibit lock-in of synchronized vortex shedding.

The resulting inner surface of the carcass with an inserted profile will have properties suitable to suppress on-set of singing or reducing pulsations to acceptable levels at least within operational window for the pipe. For a flexible riser, the operational window may be in the region of 20-25 m/s.

A further advantage with the resulting inner surface is that the improved smoothness of the surface will increase the hydraulic efficiency of the carcass. The laminar sublayer, also called the viscous sublayer, near the carcass wall is the region of a mainly turbulent flow that is near a no-slip boundary and in which the flow is laminar. The existence of the laminar sublayer can be understood in that the flow velocity decreases towards the no-slip boundary. Because of this, the Reynolds number decreases until at some point the flow crosses the threshold from turbulent to laminar.

Whether the roughness of the carcass wall is smaller or larger than this sublayer will affect the hydraulic properties of the carcass wall. Flow is defined as hydraulically rough if the roughness elements (carcass corrugations) are larger than the laminar sublayer, thereby disturbing the flow, and as hydraulically smooth if they are smaller than the laminar sublayer, therefore ignorable by the main body of the flow.

The inserted profile will reduce the carcass roughness, which will reduce the pressure drop through the flexible pipe. The positive effect of reduced carcass roughness can make the carcass insert profile attractive for use in applications of flexible pipe where flow induced vibrations is not a problem.

The profile is helically wound along the carcass gap. The profile can be retrofitted in existing pipes or be combined with a standard carcass profile during manufacture of a carcass. The profile can comprise various types of inserts of different shapes, sizes and cross-sections substantially adapted to conform to the shape of the carcass gap of the carcass in question.

The profile can be arranged to extend along the full length of the pipe or be arranged intermittently or in segments or different lengths. A length of profile can for instance be interrupted to avoid bends or joints in the pipe.

The profile can be arranged with a uniform cross-sectional profile or change in cross-sectional profile along length of gap. This can be achieved by assembling sections having different cross-sectional profiles, for instance by welding. This arrangement will facilitate production and allows for variation of the cross-sectional shape of the assembled profile along parts of or the entire length of the pipe.

The profile can be located adjacent upstream or downstream relative to a carcass section inside an adjacent carcass gap. Allowing a variation of the axial position of the profile in the carcass gap assists in breaking up series vortex generation along the carcass length The profile can be held in position by an inherent spring back force of the profile or be provided with a section that can be inserted axially between adjacent carcass sections inside the carcass gap. Alternatively the profile can be fixed at spots at each end of the profile section, along the full length of each profile section, or along the full length of the carcass. The profile can be fixed by welding, bonding or by other suitable methods.

According to the invention, an insert profile is positioned in the carcass gap between the carcass sections of the tubular wall structure on the inside of the carcass The insert profile is formed to a helical strip, thereby providing a helical insert profile, which is aligned with the helical carcass gap between the carcass sections. The profile may follow the carcass gap in the full length of the pipe from endfitting to endfitting or follow it partly in segments of the pipe. The insert profile may change in shape along the carcass gap.

The insert profile is kept in place by its own spring back stiffness along its full length or be fixed to the carcass at discrete points or along its full length by welding, bonding or other suitable method.

The insert profile is arranged to at least partly cover the gap or partly fill the gap groove both in the compressed position and in the fully extended position.

According to a first example, the insert profile comprises a first portion in the form of a protrusion extending outwards into the carcass gap between the carcass sections onto which the second portion is fixed. The second portion is in the form of a protrusion having an extension transverse to the carcass gap. The second portion is resilient or elastic and is deformed by relative movement between adjacent carcass sections. The second portion is arranged to remain at or adjacent the inner surface of the wall structure to fill the carcass gap as the carcass extends, compresses or flexes.

Generally, the second portion is arranged to substantially cover the width of the carcass gap when the adjacent interlocking sections are in a nominal position.

For both examples, the basic principle is that the inner surface maintains a smoothness sufficiently to push the on-set velocity a sufficiently high flow rates to mitigate singing for normal operation of the flexible pipe. The on-set velocity may not be pushed outside the operational window for extreme relative position of the carcass sections as most of the pipe is likely to have carcass gaps close to the gap corresponding to nominal relative position of the carcass sections. Hence, the area of the pipe generating pulsations may be too small to give pulsations with energy levels of significance to the operation of the pipe.

In this way the insert can close the carcass gap fully or in part, in order to eliminate, or at least considerably reduce problems relating to flow induced vibration caused by the corrugated inner wall structure of the pipe.

When the gap is reduced, the second portion is compressed by adjacent interlocking sections towards their first, compressed position. Although deformed, the second portion will maintain its radially inner surface at or adjacent the inner surface of the wall structure.

The first portion can be made from a suitable metal such as stainless steel, as used for the carcass, or a suitable plastic material resistant to hydrocarbons and acid gases such as $CO_2$ and $H_2S$.

The second portion is made from a suitable elastic or resilient material, such as rubber or elastomeric materials, and is bonded to or vulcanized onto the first portion. In order to improve adhesion between the first and second portions, the first portion can be provided with a series of apertures along its radially inner edge, allowing the elastic or resilient material to extend through said apertures.

According to one alternative first example, the insert profile has a substantially T-shaped cross-section. In this case the stem forms the first portion and the protrusion forming the second portion is the crossbar. During deformation, the crossbar can become curved either radially inwards or outwards, while maintaining contact with the adjacent interlocking sections with its longitudinal edges.

According to a further alternative first example, the insert profile has a substantially triangular cross-section, forming the second portion, attached to the first portion. The triangular second portion has an inner surface at or adjacent the inner surface of the wall structure in its mounted position. The second portion is formed as a solid body that is elastically or resiliently deformable. During deformation of the triangular body, the radially inner surface can become curved either radially inwards or outwards, while maintaining contact with the adjacent interlocking sections with its longitudinal corners.

According to a further alternative first example, the insert profile has a hollow cross-section forming the second portion, which protrusion has an inner surface at or adjacent the inner surface of the wall structure in its mounted position. The hollow cross-section can have a cavity on one or both sides of the first portion. In this way, when the carcass flexes to compress or extend the carcass gap, the second portion will compress or extend to substantially cover and/or fill the width of the carcass gap and maintain the radially inner surface of the second portion at or adjacent the inner surface of the wall structure.

According to a further alternative first example, the insert profile comprises a protrusion having a hollow cross-section comprising multiple, parallel cavities forming the second portion, which protrusion has an inner surface at or adjacent the inner surface of the wall structure in its mounted position. In this way, when the carcass flexes to compress or extend the carcass gap, the multiple cavities of the second portion will compress or extend to cover the width of the carcass gap and maintain the radially inner surface of the second portion at or adjacent the inner surface of the wall structure.

The use of a second portion comprising single or multiple cavities allows the width of the carcass gap to be substantially covered and/or filled. During compression of the carcass gap a second portion comprising such a cavity or cavities can be deformed by adjacent carcass sections to substantially fill the carcass gap. During expansion of the carcass gap the second portion will expand to substantially cover the carcass gap.

According to a second example, the insert profile comprises a first portion in the form of a protrusion extending outwards into the carcass gap between the carcass sections onto which the second portion is fixed. The second portion comprises a flat strip covering or partly covering the top of the carcass gap. The first and second portion form resembling a T-shaped profile. The width of the strip in the second portion, the edge shape and surface texture may change along the carcass gap. The insert profile has a fixed T-shaped cross-section, where the stem forms a first portion extending into the carcass gap. In this example, the crossbar of the T-shaped cross-section forms a second portion that is in contact with the inside, or inner surface of the wall structure on at least one side of the carcass gap.

The second portion is arranged to remain at or adjacent the inner surface of the wall structure to fill the carcass gap as the carcass extends, compresses or flexes. When adjacent interlocking sections are in their first position, the carcass gap is at a minimum, wherein the crossbar is in contact with the radially inner surface of the wall structure on both sides of the carcass gap. Similarly, when adjacent interlocking sections are in their second position, the carcass gap is at a maximum, wherein the crossbar is in contact with the radially inner surface of the wall structure on one side of the carcass gap.

The T-shaped insert can be made from a suitable metal such as stainless steel, as used for the carcass, or a suitable plastic material resistant to hydrocarbons and acid gases such as $CO_2$ and $H_2S$. A metal insert can be assembled from individual strips or be rolled into a desired profile. A plastic insert can, for instance, be extruded to form a desired profile.

The exact dimensions of any one of the insert profiles described above varies dependent on the diameter and length of the carcass, the cross-sectional shape of the interlocking profiles, which determines the depth and maximum/minimum size of the carcass gap, and the operating conditions under which the carcass and the pipe is being used.

The insert profile as described in the above examples can be mounted to the flexible pipe carcass in a number of different ways. According to a first example, the insert profile is attached to one of the adjacent wall strips forming the tubular wall structure. The insert profile can be attached along a part or the whole of its length. Preferably, the insert profile is attached to one of the adjacent wall strips forming the tubular wall structure along at least a majority of its longitudinal extension. The insert profile can be attached by means of welding or soldering.

According to a second example, the insert profile is attached by a locking portion of the insert extending axially between the interlocking sections of the helically wound wall strip and cooperating with a groove in one of the adjacent wall strips. The locking portion forms an extension of the first portion. The insert profile according to these examples is preferably, but not necessarily, attached during winding of the interlocking sections.

According to a third example, the insert profile forms a coiled spring expanded into contact with the tubular wall structure. This arrangement is particularly suitable for an insert profile such as the fixed T-shaped cross-section described above. In this case, the stem forms a first portion extending into the carcass gap and the crossbar forms a second portion that is movably supported by the inner surface of the wall structure on at least one side of the carcass gap. An insert profile of this type is attached to one of the adjacent wall strips forming the tubular wall structure at each of its ends. Due to the inherent properties of coils springs in general, the insert profile is preferably given a predetermined length that is dependent on the dimensions of the insert profile. The insert profile is attached at its ends and can be mounted during winding of the interlocking sections or be assembled subsequently.

The invention also involves a method of manufacturing a flexible pipe carcass according to the invention. The method comprises the step of:

forming a wall structure comprising interlocking sections, such that the interlocking sections of each pair define a length and are movable with respect to each other between a first, compressed position and a second, extended position for changing said length, wherein a carcass gap is formed between the interlocking sections for accommodating relative movement there between; and locating an insert profile contacting the wall structure on an inside of the wall structure, such that the insert at least partly covers the carcass gap.

The method further involves helically winding a wall strip to form the tubular wall structure, the interlocking sections comprising interlocking sections of successive windings of said wall strip; and wherein the insert profile is in the form of a strip, and the method further includes winding the insert profile to follow and align with the wall strip.

According to a first alternative method, the steps of winding the wall strip and the winding of the insert profile are performed in succession and repeated.

According to a second alternative method, the steps of winding the wall strip and the insert profile are performed simultaneously.

The insert profile can be attached to one of the adjacent wall strips forming the tubular wall structure along at least a majority of its longitudinal extension. According to one example, the insert profile is attached to an adjacent wall strip along its entire length. This arrangement is suitable for insert profiles that must be fixed into a predetermined position relative to said one adjacent wall strip. This attachment method is preferably performed during simultaneous winding the wall strip and the insert profile.

According a further example, the insert profile is attached to an adjacent wall strip at both ends. This arrangement is suitable for insert profiles forming a coiled spring that is expanded into contact with the tubular wall structure. This attachment method is preferably performed during simultaneous winding the wall strip and the insert profile, but can also be performed subsequently. In the latter case, the insert profile forms a coiled spring that is compressed, inserted into the pipe and then expanded into contact with the tubular wall structure.

Alternatively, the insert profile can be mounted between adjacent wall strips forming the tubular wall structure. The insert profile is attached by inserting a locking portion of the insert profile axially between the interlocking sections of the helically wound wall strip, optionally with a shaped inner end of the first portion cooperating with a groove in one of the adjacent wall strips. This attachment method is preferably performed during simultaneous winding the wall strip and the insert profile, but can also be performed subsequently.

The invention further relates to a machine for manufacturing a flexible pipe carcass, the machine being configured to perform the method as described above.

BRIEF DESCRIPTION OF DRAWINGS

In the following text, the invention will be described in detail with reference to the attached drawings. These schematic drawings are used for illustration only and do not in any way limit the scope of the invention. In the drawings.

EMBODIMENTS OF THE INVENTION

Figure 1:
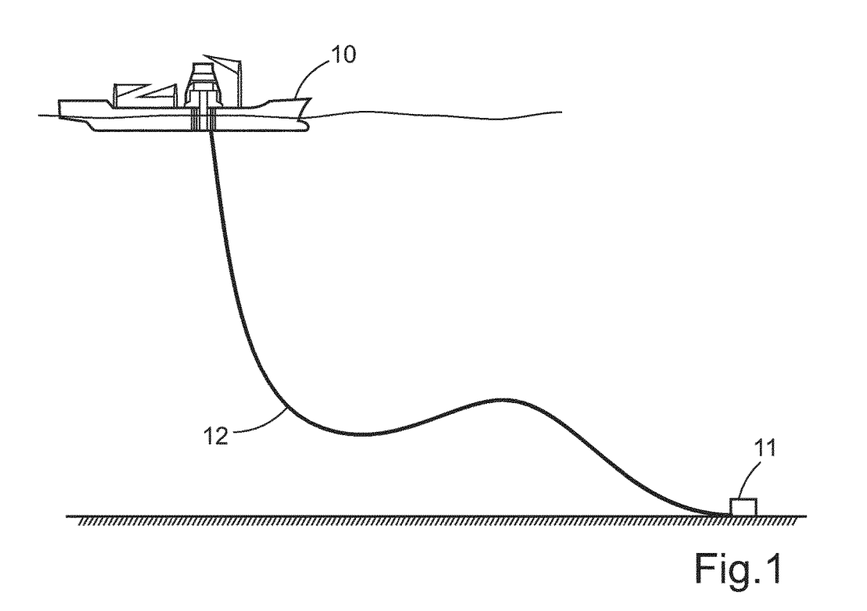
FIG. 1 shows a riser extending from the sea floor to a production vessel.

FIG. 1 shows a flexible riser 11 extending from the sea floor to a production vessel 10. Oil is produced by subsea wells via a manifold, which passes through rigid flow lines and then flexible risers into a floating production, storage and offloading system. The vessel shown in this figure is a ship, but the arrangement is applicable on any type of floating, semi-submersible of permanent production platform. Flexible risers can withstand both vertical and horizontal movement, making them ideal for use with floating facilities. The flexible pipe was originally used to connect production equipment aboard a floating facility to production and export risers, can be used as a primary riser solution as well. There are a number of configurations for flexible risers, including the steep S and lazy S that utilize anchored buoyancy modules, as well as the steep wave and lazy wave that incorporates buoyancy modules. FIG. 1 indicates both a lazy wave arrangement of the flexible riser.

Figure 2:
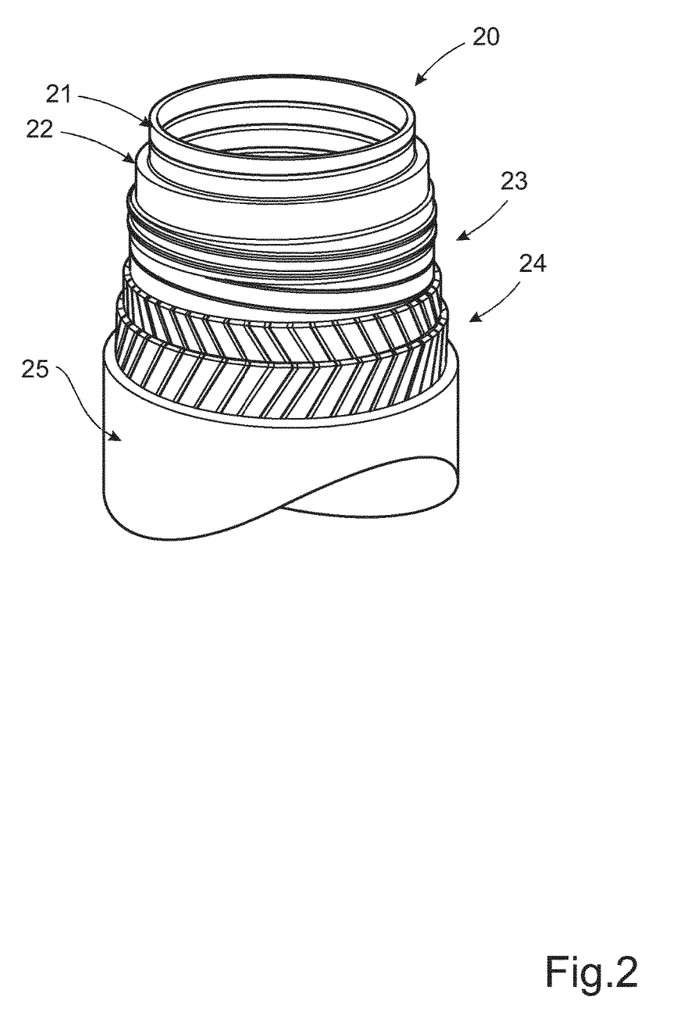
FIG. 2 shows a schematic illustration of the layers making up a conventional flexible riser.

FIG. 2 shows a schematic illustration of the layers making up a conventional flexible riser 20. In this example, the riser comprises, from the inner to the outer layer, an internal load bearing structural layer 21 arranged to withstand external pressure, often termed a carcass, a fluid tight pressure barrier 22, at least one external load bearing structural layer 23, 24 and an outer layer 25 or protective sheath. The carcass 21 forms the innermost layer of the flexible riser and is commonly made from stainless steel flat strip that is shaped and wound into an interlocking profiled tube. The pressure barrier is encased by a pressure amour and a tensile armour. The pressure armour 23 is arranged to withstand the hoop stress in the riser wall caused by the inner fluid pressure. The pressure armour is wound around the pressure barrier and comprises interlocking wires. FIG. 2 shows two pressure armour layers. The tensile armour 24 comprises layers of flat, rectangular wires cross-wound in pairs and is used to resist tensile load on the flexible riser. The outer layer 25 or protective sheath is an outer polymer sheath that can be made from the same material as the pressure barrier. The outer layer 25 is a barrier against seawater and provides a level of protection for the armour layers. In this example, the annulus is located between the pressure barrier 22 and the outer layer 25.

Figure 3:
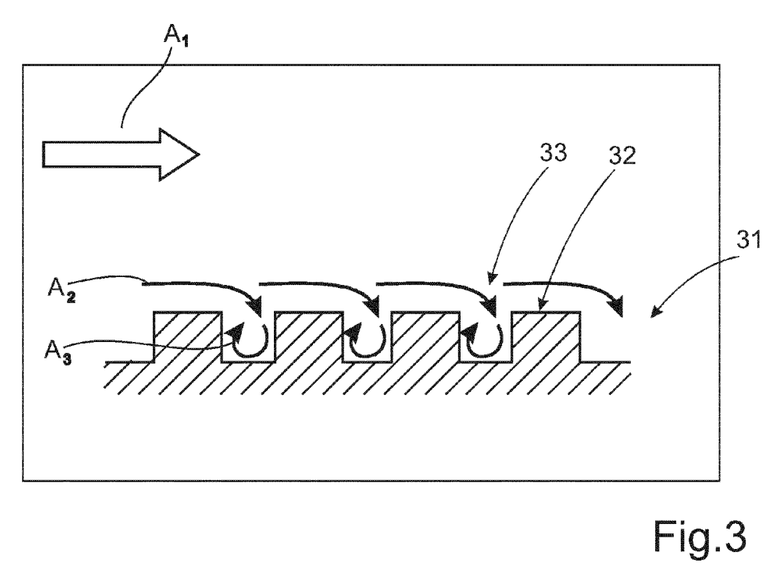
FIG. 3 shows a schematic cross-section of a carcass of the type indicated in FIG. 2.

FIG. 3 shows a schematic cross-section of a carcass 31 of the type indicated in FIG. 2. The inner surface 32 of the carcass has a corrugated shape created by interlocking sections. The interlocking sections of adjacent wall strips define a length and are movable with respect to each other in the axial direction of the carcass. In an extended position a carcass gap 33 is formed between adjacent interlocking sections. A fluid flow $A_1$ through the carcass 31 will cause fluid in the boundary layer $A_2$ to be diverted into the carcass gap 33, thus creating a vortex $A_3$ within the carcass gap 33. In this way the internal profile of the carcass can cause flow induced vibration or flow induced pulsations, commonly termed "singing", inside the riser.

Figure 4A:
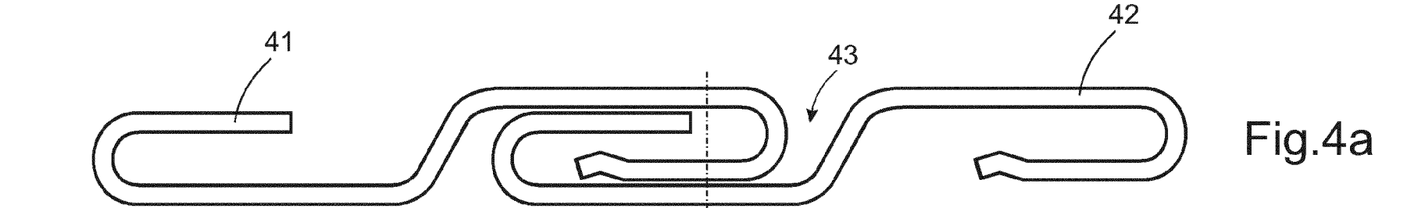
FIGS. 4a-c show a cross-section of two adjacent interlocking sections in a carcass.
Figure 4B:
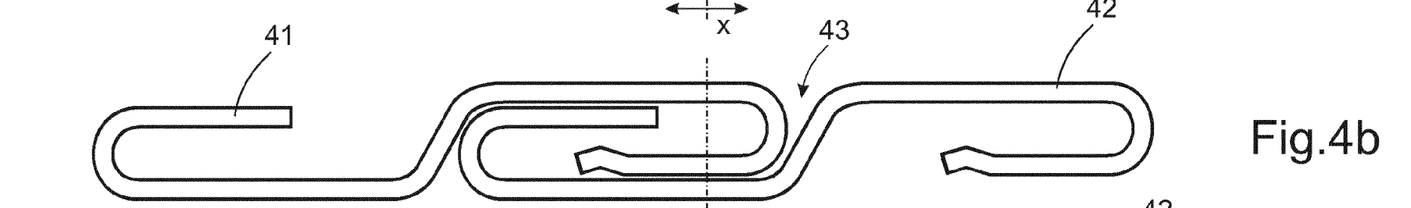
Figure 4C:
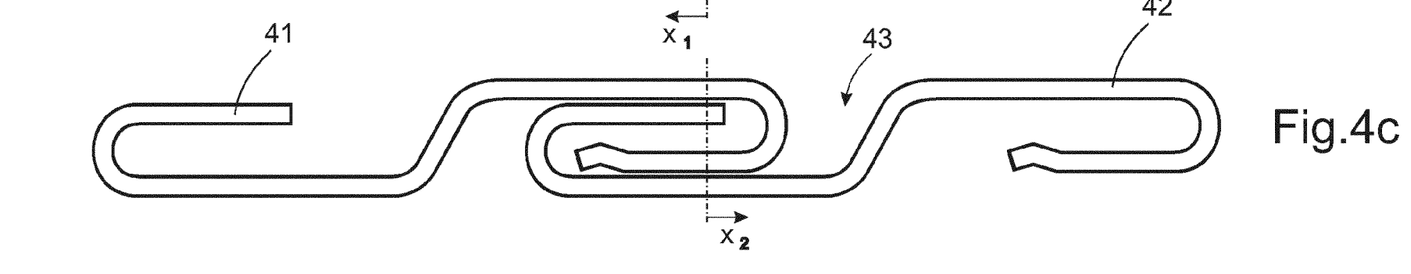

FIGS. 4A-4C show a cross-section of two adjacent interlocking sections 41, 42 in a carcass. The interlocking sections 41, 42 of adjacent wall strips have a general, extended S-shaped cross-section and define a length and are movable with respect to each other in the axial direction of the carcass, as indicated by arrow X. The interlocking sections 41, 42 are movable between a first, compressed position X1 and a second, extended position X2 for changing said length. An intermediate position, where the carcass has a nominal length and is substantially straight, is located between the first and second positions as shown in FIG. 4A. The interlocking sections are formed such that in the extended position a carcass gap 43 is provided between adjacent interlocking sections for accommodating relative movement there between upon flexure of the wall structure. Such interlocking sections are well known in the art and will not be described in further detail.

According to the invention, an insert is located in the carcass gap of the tubular wall structure on an inside of the wall structure to at least partly cover the carcass gap. The insert is arranged to at least partly cover the carcass gap in both in the first position and in the second position. Further, the insert is formed of a helical strip, thereby providing a helical insert profile, which is aligned with the helical wall strip and the carcass gap of the tubular structure. Non-limiting examples of such insert profiles will be described in connection with FIGS. 5-11.

Figure 5A:
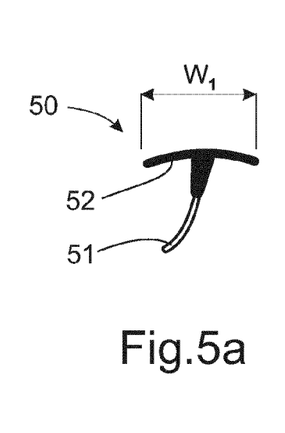
FIGS. 5a-d show a first example of an insert profile according to the invention.
Figure 5B:
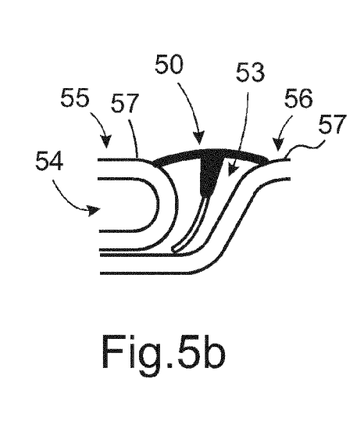
Figure 5C:
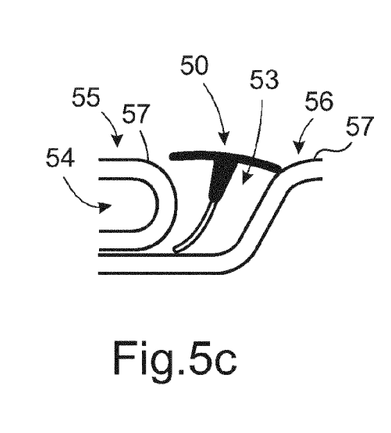
Figure 5D:
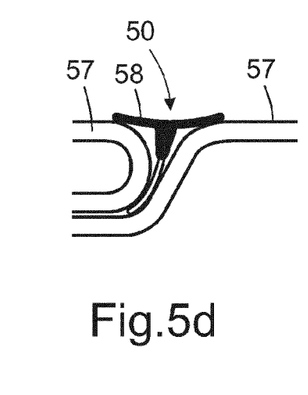

FIGS. 5A-5D show a first example of an insert profile 50 according to the invention, which insert profile has a resilient portion. The insert profile 50 in FIG. 5A has a length in the direction of helical winding, and a width W1 in the axial direction of the carcass 54 (FIG. 5B) which width is variable along its length. The insert profile 50 comprises a first portion 51 in the form of a protrusion extending outwards into a carcass gap 53 (FIG. 5B) between each pair of interlocking sections 55, 56. The insert profile 50 further comprises a second portion 52 in the form of a further protrusion having an extension in the axial direction of the carcass. The insert profile 50 shown in FIGS. 5B-5D is fixed to one of the interlocking sections 56 by a weld at either end. Between its ends the second portion 52 will have some freedom of axial movement between the adjacent interlocking sections 56, 57.

Alternatively, the free end of the first portion located in the carcass gap can be extended a predetermined distance in the axial direction of the carcass, to be held in position between two adjacent interlocking carcass sections.

The second portion 52 is resilient or elastic and is deformed by relative movement between adjacent interlocking sections 55, 56, as indicated in FIGS. 5B-5D. According to this example, the insert profile has a substantially T-shaped cross-section. In this case the stem forms the first portion 51 and the protrusion forming the second portion 52 is the crossbar. The second portion 52 has an inner surface 58 facing the central axis of the carcass 54. The second portion 52 is arranged to remain in contact with or adjacent the inner surface 57 of the wall structure to fill the carcass gap 53 as the riser carcass 54 extends, compresses or flexes. FIG. 5C shows an extended position and FIG. 5D shows a compressed position. In this way the insert profile 50 can close the carcass gap 53 fully or in part, in order to eliminate, or at least considerably reduce problems relating to flow induced vibration caused by the corrugated inner wall structure of the riser.

Generally, in its unloaded state shown in FIG. 5A, the second portion 52 can cover a major portion of the width of the carcass gap 53 when the adjacent interlocking sections 55, 56 are in an extended position (FIG. 5C). When the adjacent interlocking sections 55, 56 are in a nominal position (FIG. 5B), the second portion 52 can cover substantially the full width of the carcass gap 53. When the gap is reduced, the second portion is compressed by adjacent interlocking sections towards their compressed position (FIG. 5D). Although deformed, the second portion 52 will maintain its radially inner surface 58 at or adjacent the inner surface 57 of the wall structure. During deformation, the crossbar can become curved either radially inwards or outwards, while maintaining contact with the adjacent interlocking sections with its longitudinal edges.

Figure 6A:
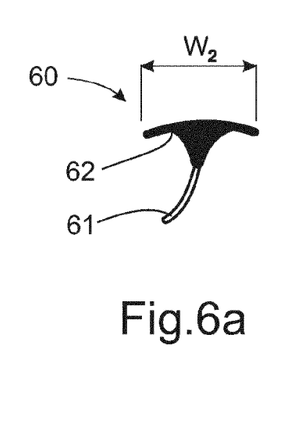
FIGS. 6a-d show an alternative first example of an insert profile according to the invention.
Figure 6B:
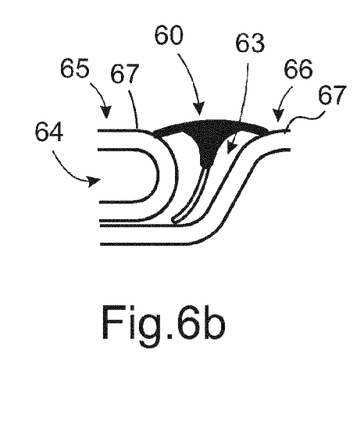
Figure 6C:
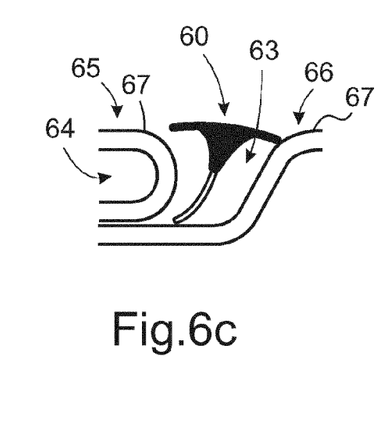
Figure 6D:
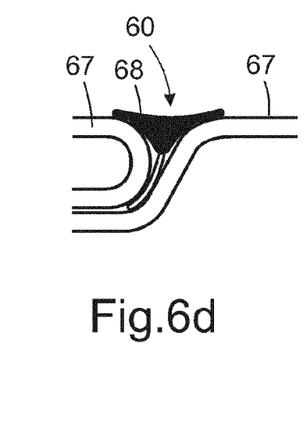

FIGS. 6A-6D show an alternative first example of an insert profile 60 according to the invention, which insert profile has a resilient portion. The insert profile 60 in FIG. 6A has a length in the direction of helical winding, and a width W2 in the axial direction of the carcass 64 (FIG. 6B) which width is variable along its length. The insert profile 60 comprises a first portion 61 in the form of a protrusion extending outwards into a carcass gap 63 (FIG. 6B) between each pair of interlocking sections 65, 66. The insert profile 60 further comprises a second portion 62 in the form of a further protrusion having an extension in the axial direction of the carcass. The insert profile 60 shown in FIGS. 6B-6D is fixed to one of the interlocking sections 66 by a weld at either end. Between its ends the second portion 62 will have some freedom of axial movement between the adjacent interlocking sections 66, 67.

The second portion 62 is resilient or elastic and is deformed by relative movement between adjacent interlocking sections 65, 66, as indicated in FIGS. 6B-6D. According to this example, the insert profile 60 has a substantially triangular cross-section, forming the second portion 62, attached to the first portion 61. The triangular second portion 62 has an inner surface 68 facing the central axis of the carcass at or adjacent the inner surface 67 of the wall structure in its mounted position. The second portion 62 is formed as a solid body that is elastically or resiliently deformable. The second portion 62 is arranged to remain in contact with or adjacent the inner surface 67 of the wall structure to fill the carcass gap 63 as the riser carcass 64 extends, compresses or flexes. FIG. 6C shows an extended position and FIG. 6D shows a compressed position. In this way the insert profile 60 can close the carcass gap 63 fully or in part, in order to eliminate, or at least considerably reduce problems relating to flow induced vibration caused by the corrugated inner wall structure of the riser.

Generally, in its unloaded state shown in FIG. 6A, the second portion 62 can cover a major portion of the width of the carcass gap 63 when the adjacent interlocking sections 65, 66 are in an extended position (FIG. 6C). When the adjacent interlocking sections 65, 66 are in a nominal position (FIG. 6B), the second portion 62 can cover substantially the full width of the carcass gap 63. When the gap is reduced, the second portion is compressed by adjacent interlocking sections towards their compressed position (FIG. 6D). Although deformed, the second portion 62 will maintain its radially inner surface 68 at or adjacent the inner surface 67 of the wall structure. During deformation of the triangular body, the radially inner surface 68 can remain straight or become curved either radially inwards or outwards, while maintaining contact with the adjacent interlocking sections 65, 66 with its longitudinal corners.

Figure 7A:
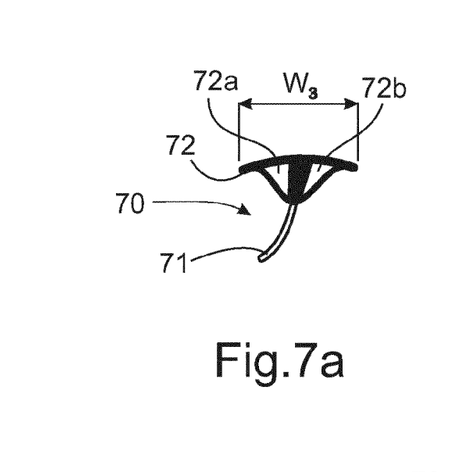
FIGS. 7a-e show a further alternative first example of an insert profile according to the invention.
Figure 7B:
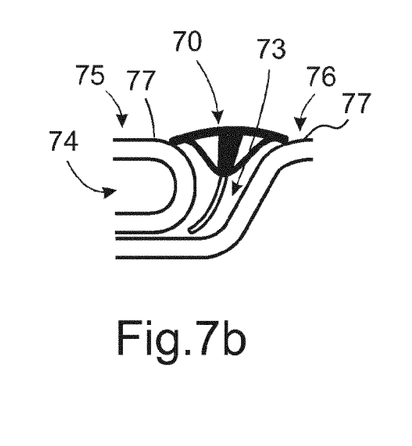
Figure 7C:
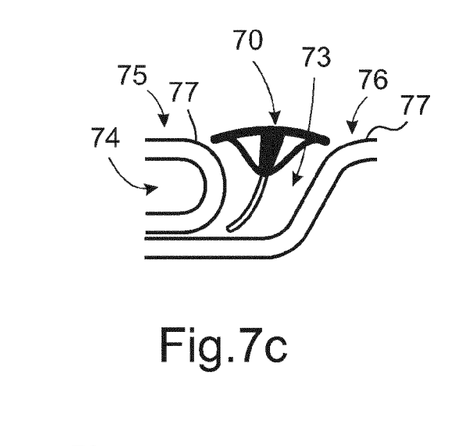
Figure 7D:
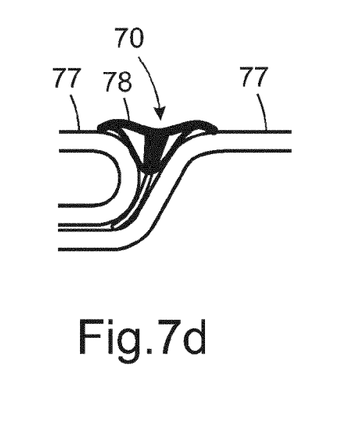
Figure 7E:
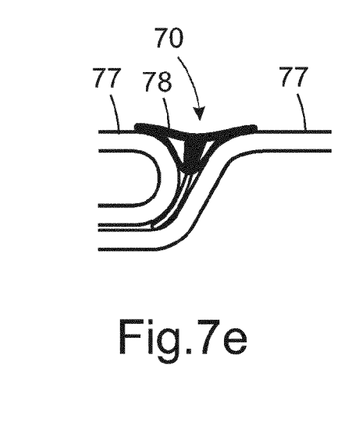

FIGS. 7A-7D show a further alternative first example of a insert profile 70 according to the invention, which insert profile has a resilient portion. The insert profile 70 in FIG. 7A has a length in the direction of helical winding, and a width W3 in the axial direction of the carcass 74 (FIG. 7B) which width is variable along its length. The insert profile 70 comprises a first portion 71 in the form of a protrusion extending outwards into a carcass gap 73 (FIG. 7B) between each pair of interlocking sections 75, 76. The insert profile 70 further comprises a second portion 72 in the form of a further protrusion having an extension in the axial direction of the carcass. The insert profile 70 shown in FIGS. 7B-7D is fixed to one of the interlocking sections 76 by a weld at either end. Between its ends the second portion 72 will have some freedom of axial movement between the adjacent interlocking sections 76, 77.

The second portion 72 is resilient or elastic and is deformed by relative movement between adjacent interlocking sections 75, 76, as indicated in FIGS. 7B-7D. According to this example, the insert profile 70 has a substantially triangular cross-section, forming the second portion 72, attached to the first portion 71. The triangular second portion 72 has an inner surface 78 facing the central axis of the carcass 74 at or adjacent the inner surface 77 of the wall structure in its mounted position. The second portion 72 contains two hollow parallel longitudinal cavities 72a, 72b which are elastically or resiliently deformable. The second portion 72 is arranged to remain in contact with or adjacent the inner surface 77 of the wall structure to fill the carcass gap 73 as the riser carcass 74 extends, compresses or flexes. FIG. 7C shows an extended position and FIG. 7D shows a compressed position. In this way the insert profile 70 can close the carcass gap 73 fully or in part, in order to eliminate, or at least considerably reduce problems relating to flow induced vibration caused by the corrugated inner wall structure of the riser.

Generally, in its unloaded state shown in FIG. 7A, the second portion 72 can cover a major portion of the width of the carcass gap 73 when the adjacent interlocking sections 75, 76 are in an extended position (FIG. 7C). When the adjacent interlocking sections 75, 76 are in a nominal position (FIG. 7B), the second portion 72 can cover substantially the full width of the carcass gap 73. When the gap is reduced, the second portion is compressed by adjacent interlocking sections towards their compressed position (FIG. 7D). Although deformed, the second portion 72 will maintain its radially inner surface 78 at or adjacent the inner surface 77 of the wall structure. During deformation of the triangular body, the radially inner surface 78 can remain straight or become curved either radially inwards or outwards, while maintaining contact with the adjacent interlocking sections 75, 76 with its longitudinal edges.

Figure 8A:
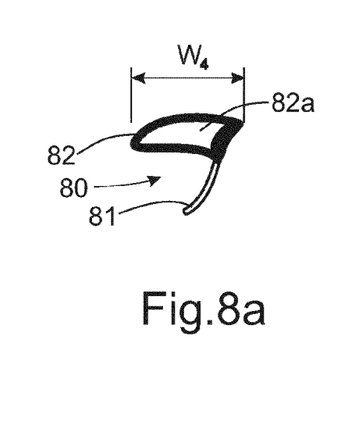
FIGS. 8a-d show a further alternative first example of an insert profile according to the invention.
Figure 8B:
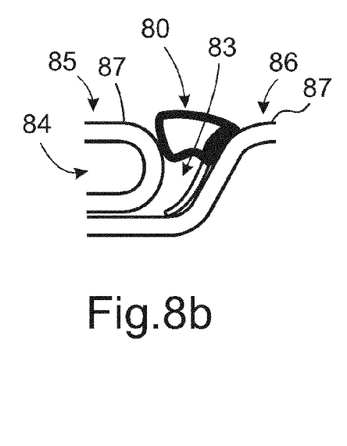
Figure 8C:
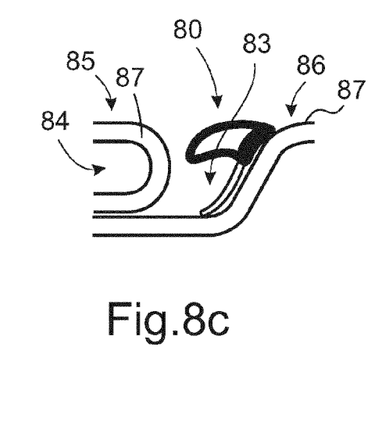
Figure 8D:
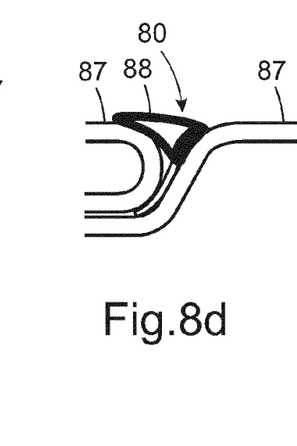

FIGS. 8A-8D show a further alternative first example of a insert profile 80 according to the invention, which insert profile has a resilient portion. The insert profile 80 in FIG. 8A has a length in the direction of helical winding, and a width W4 in the axial direction of the carcass 84 (FIG. 8B) which width is variable along its length. The insert profile 80 comprises a first portion 81 in the form of a protrusion extending outwards into a carcass gap 83 (FIG. 8B) between each pair of interlocking sections 85, 86. The insert profile 80 further comprises a second portion 82 in the form of a further protrusion having an extension in the axial direction of the carcass. The insert profile 80 shown in FIGS. 8B-8D is fixed to one of the interlocking sections 86 along a longitudinal weld, whereby the second portion 82 will extend towards the adjacent interlocking section 87.

The second portion 82 is resilient or elastic and is deformed by relative movement between adjacent interlocking sections 85, 86, as indicated in FIGS. 8B-8D. According to this example, the insert profile 80 has a substantially oval cross-section forming the second portion 82, attached to one side the first portion 81. The oval second portion 82 has an inner surface 88 facing the central axis of the carcass 84 at or adjacent the inner surface 87 of the wall structure in its mounted position. The second portion 82 contains a single longitudinal cavity 82a which is elastically or resiliently deformable. The second portion 82 is arranged to remain in contact with or adjacent the inner surface 87 of the wall structure to fill the carcass gap 83 as the riser carcass 84 extends, compresses or flexes. FIG. 8C shows an extended position and FIG. 8D shows a compressed position. In this way the insert profile 80 can close the carcass gap 83 fully or in part, in order to eliminate, or at least considerably reduce problems relating to flow induced vibration caused by the corrugated inner wall structure of the riser.

Generally, in its unloaded state shown in FIG. 8A, the second portion 82 can cover a major portion of the width of the carcass gap 83 when the adjacent interlocking sections 85, 86 are in an extended position (FIG. 8C). When the adjacent interlocking sections 85, 86 are in a nominal position (FIG. 8B), the second portion 82 can cover substantially the full width of the carcass gap 83. When the gap is reduced, the second portion is compressed by adjacent interlocking sections towards their compressed position (FIG. 8D). Although deformed, the second portion 82 will maintain its radially inner surface 88 at or adjacent the inner surface 87 of the wall structure. During deformation of the oval body, the radially inner surface 88 can be deformed to become curved either radially inwards or outwards, while maintaining contact with the adjacent interlocking sections 85, 86 with its longitudinal rounded end surfaces.

Figure 9A:
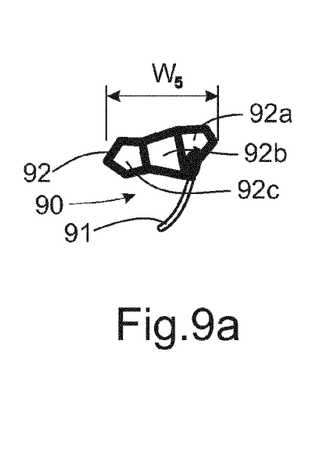
FIGS. 9a-d show a further alternative first example of an insert profile according to the invention.
Figure 9B:
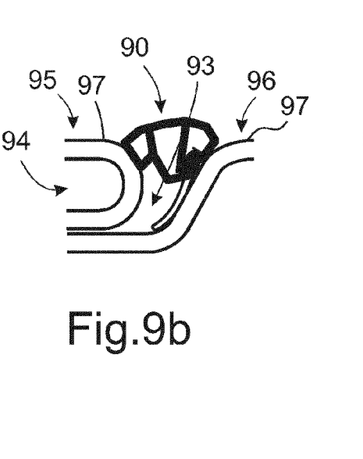
Figure 9C:
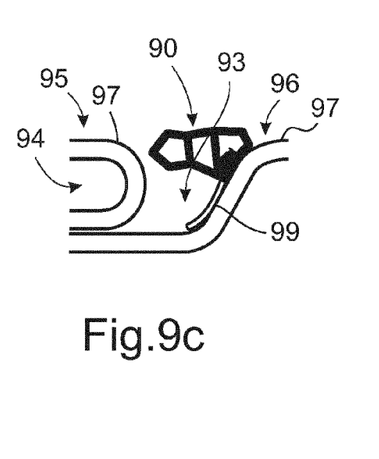
Figure 9D:
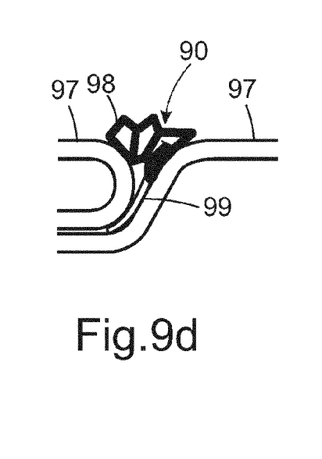
Figure 10A:
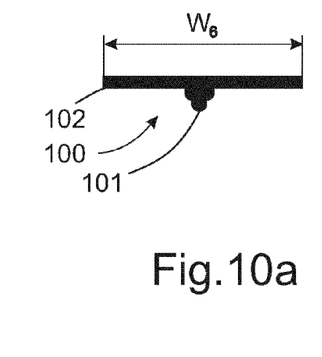
FIGS. 10a-d show a second example of an insert profile according to the invention.
Figure 10B:
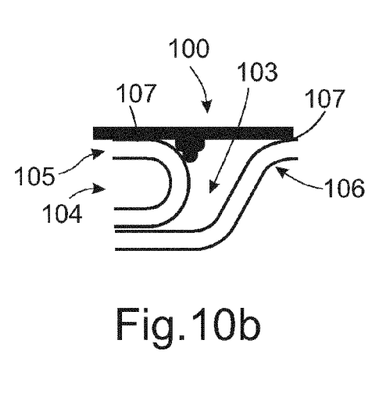
Figure 10C:
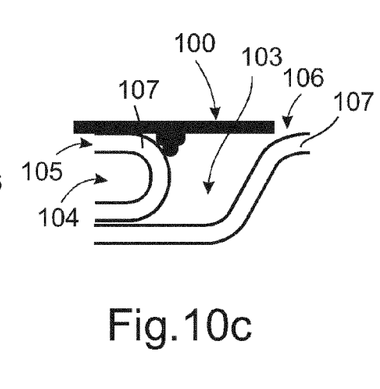
Figure 10D:
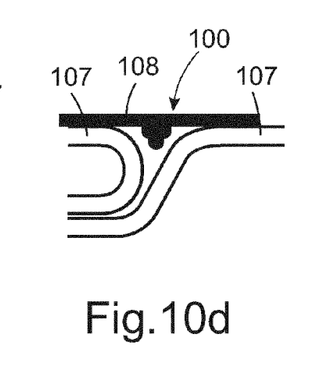

FIGS. 9A-9D show a further alternative first example of a insert profile 90 according to the invention, which insert profile has a resilient portion. The insert profile 90 in FIG. 9A has a length in the direction of helical winding, and a width W4 in the axial direction of the carcass 94 (FIG. 9B) which width is variable along its length. The insert profile 90 comprises a first portion 91 in the form of a protrusion extending outwards into a carcass gap 93 (FIG. 9B) between each pair of interlocking sections 95, 96. The insert profile 90 further comprises a second portion 92 in the form of a further protrusion having an extension in the axial direction of the carcass. The insert profile 90 shown in FIGS. 9B-9D is fixed to one of the interlocking sections 96 along a longitudinal weld, whereby the second portion 92 will extend towards the adjacent interlocking section 97.

The second portion 92 is resilient or elastic and is deformed by relative movement between adjacent interlocking sections 95, 96, as indicated in FIGS. 9B-9D. According to this example, the insert profile 90 has a multi-polygonal cross-section forming the second portion 92, attached to one side the first portion 91. The multi-polygonal second portion 92 has an inner surface 98 facing the central axis of the carcass 94 at or adjacent the inner surface 97 of the wall structure in its mounted position. The second portion 92 contains multiple longitudinal cavities 92a, 92b, 92c which are elastically or resiliently deformable. The second portion 92 is arranged to remain in contact with or adjacent the inner surface 97 of the wall structure to fill the carcass gap 93 as the riser carcass 94 extends, compresses or flexes. FIG. 9C shows an extended position and FIG. 9D shows a compressed position. In this way the insert profile 90 can close the carcass gap 93 fully or in part, in order to eliminate, or at least considerably reduce problems relating to flow induced vibration caused by the corrugated inner wall structure of the riser.

Generally, in its unloaded state shown in FIG. 9A, the second portion 92 can cover a major portion of the width of the carcass gap 93 when the adjacent interlocking sections 95, 96 are in an extended position (FIG. 9C). When the adjacent interlocking sections 95, 96 are in a nominal position (FIG. 9B), the second portion 92 can cover substantially the full width of the carcass gap 93. When the gap is reduced, the second portion is compressed by adjacent interlocking sections towards their compressed position (FIG. 9D). Although deformed, the second portion 92 will maintain its radially inner surface 98 at or adjacent the inner surface 97 of the wall structure. During deformation of the multi-polygonal body, the radially inner surface 98 can be deformed to become ridged surface, while maintaining contact with the adjacent interlocking sections 95, 96 with two opposing end surfaces. FIGS. 9A-9D show a multi-polygonal body made up of three pentagonal cavities, each connected to the next via a common edge. However, the number of cavities can be varied from 2-5 and the cross-section can also be triangular, square or hexagonal.

The first portion in the above examples can be made from a suitable metal such as stainless steel, as used for the carcass, or a suitable plastic material resistant to hydrocarbons and acid gases such as $CO_2$ and $H_2S$. The second portion in these examples is made from a suitable elastic or resilient material, such as rubber or elastomeric materials, and is bonded to or vulcanized onto the first portion. In order to improve adhesion between the first and second portions, the first portion can be provided with a series of apertures along its radially inner edge, allowing the elastic or resilient material to extend through said apertures.

FIGS. 10A-10D show a second example of an insert profile 100 according to the invention, which the insert profile has a fixed T-shaped cross-section. The insert profile 100 in FIG. 10A has a length in the direction of helical winding, and a width W6 in the axial direction of the carcass 104 (FIG. 10B) which width is fixed along its length. The insert profile 100 comprises a first portion 101 in the form of the stem of the T-shape extending outwards into a carcass gap 103 (FIG. 10B) between each pair of interlocking sections 105, 106. The insert profile 100 further comprises a second portion 102 in the form of the crossbar of the T-shape having an extension in the axial direction of the carcass. The width W6 of the second portion 102 is greater than the maximum width of the carcass gap 103. The second portion 102 is in contact with the inside, or inner surfaces 107 of the adjacent interlocking sections 105, 106 on both sides of the carcass gap 103 at all times.

The insert profile 100 in the second example forms a coiled spring expanded into contact with the tubular wall structure. This arrangement is particularly suitable for an insert profile such as the fixed T-shaped cross-section described above. In this case, the stem of the T-shape forms the first portion 101 extending a limited distance into the carcass gap 103 between adjacent interlocking sections 105, 106. The crossbar forms the second portion 102 that is movably supported by the inner surface 107 of the wall structure both sides of the carcass gap. An insert profile 100 of this type is attached to one of the adjacent interlocking sections forming the tubular wall structure at each of its ends.

FIGS. 11A-11D show an alternative second example of a insert profile 110 according to the invention, which the insert profile also has a fixed T-shaped cross-section. The insert profile 110 in FIG. 11A has a length in the direction of helical winding, and a width W7 in the axial direction of the carcass 114 (FIG. 11B) which width is fixed along its length. This arrangement is substantially identical to the example shown in FIG. 10A-10D. The alternative second example in FIG. 11A-11D differs from the second example in that the stem of the T-shape that forms the first portion 111 extends the full radial depth into the carcass gap 113 between adjacent interlocking sections 115, 116 of the carcass 114. The crossbar forms the second portion 112 that is movably supported by the inner surface 117 of the wall structure both sides of the carcass gap. The insert profile 110 in the alternative second example forms a coiled spring expanded into contact with the tubular wall structure. The insert profile 110 is attached by welding to one of the adjacent interlocking sections 106 forming the tubular wall structure at each of its ends.

Figure 11A:
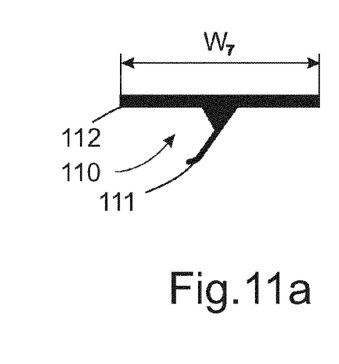
FIGS. 11a-d show an alternative second example of an insert profile according to the invention.
Figure 11B:
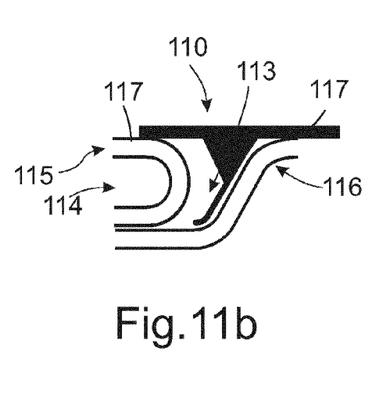
Figure 11C:
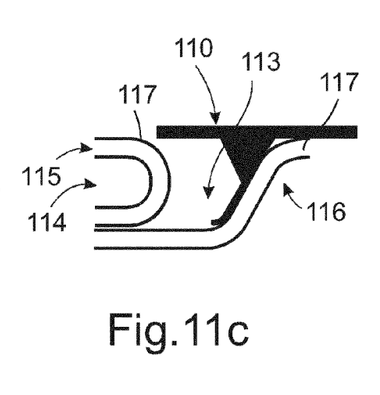
Figure 11D:
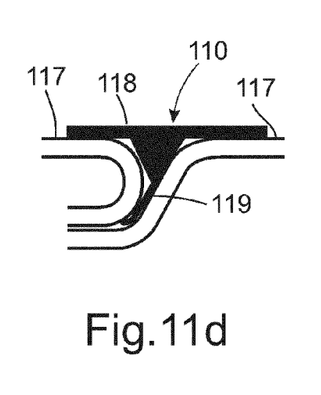

Alternatively, the insert profile in FIGS. 11A-11B can be attached to one of the adjacent interlocking sections along its full length, in the same way as described in FIGS. 8A-8D above.

The fixed T-shaped insert can be made from a suitable metal such as stainless steel, as used for the carcass, or a suitable plastic material resistant to hydrocarbons and acid gases such as $CO_2$ and $H_2S$. A metal insert can be assembled from individual strips or be rolled into a desired profile. A plastic insert can, for instance, be extruded to form a desired profile.

The exact dimensions of any one of the insert profiles described above varies dependent on the diameter and length of the carcass, the cross-sectional shape of the interlocking profiles, which determines the depth and maximum/minimum size of the carcass gap, and the operating conditions under which the carcass and riser is being used.

The invention is not limited to the specific examples described above. The examples relate to a flexible riser, but the invention can be applied to other flexible pipes in the same technical field, such as flow-lines and jumpers.

The invention claimed is:

1. A flexible inner pipe carcass of a flexible riser, flow line or jumper comprising:
a flexible tubular wall structure comprising a helically wound wall strip, wherein interlocking sections of successive windings of said wall strips form the wall structure; the interlocking sections of adjacent wall strips defining a length and being movable with respect to each other between a first position and a second, extended position for changing said length, the interlocking sections being formed such that a carcass gap is provided between adjacent interlocking sections for accommodating relative movement there between upon flexure of the wall structure; characterized in that an insert profile is located in the carcass gap of the tubular wall structure on an inside of the wall structure to at least partly cover and/or fill the carcass gap, said insert profile comprising a first portion in the form of a protrusion extending outwards into the carcass gap, and a second portion fixed onto the first portion, the second portion being in the form of a protrusion having an extension transverse to the carcass gap, wherein the second portion is resilient or elastic and wherein the pipe carcass is arranged so that in use the second portion is deformed by relative movement between adjacent interlocking sections.

2. A flexible inner pipe carcass of a flexible riser, flow line or jumper according to claim 1, characterized in that the insert profile is arranged to at least partly cover the carcass gap in both in the first position and in the second position.

3. A flexible inner pipe carcass of a flexible riser, flow line or jumper according to claim 2, characterized in that the insert profile is formed of a helical strip, thereby providing a helical insert profile, which is aligned with the helical wall strip of the tubular structure.

4. A flexible inner pipe carcass of a flexible riser, flow line or jumper according to claim 3, characterized in that the insert profile has a length in the direction of helical winding, and a width which is variable along its length.

5. A flexible inner pipe carcass of a flexible riser, flow line or jumper according to claim 4, characterized in that the insert profile comprises a first portion in the form of a protrusion extending outwards into the carcass gap between each pair of interlocking sections.

6. A flexible inner pipe carcass of a flexible riser, flow line or jumper according to claim 1, characterized in that the insert profile comprises a protrusion having a T-shaped cross-section, where the cross-bar forms the second portion.

7. A flexible inner pipe carcass of a flexible riser, flow line or jumper according to claim 1, characterized in that the insert profile comprises a protrusion having a triangular cross-section forming the second portion.

8. A flexible pipe carcass according to claim 1, characterized in that the insert profile comprises a protrusion having a hollow cross-section forming the second portion, which protrusion has an inner surface at or adjacent the inner surface of the wall structure.

9. A flexible pipe carcass according to claim 1, characterized in that the insert profile comprises a protrusion having a hollow cross-section comprising multiple cavities forming the second portion, which protrusion has an inner surface at or adjacent the inner surface of the wall structure.

10. A flexible inner pipe carcass of a flexible riser, flow line or jumper according to claim 1, characterized in that the insert profile has a T-shaped cross-section, including a stem extendable into the carcass gap.

11. A flexible inner pipe carcass of a flexible riser, flow line or jumper according to claim 10, characterized in that a cross-bar of said stem is in contact with the inside of the wall structure on at least one side of the carcass gap.

12. A flexible inner pipe carcass of a flexible riser, flow line or jumper according to claim 1, characterized in that the insert profile is attached to one of the adjacent wall strips forming the tubular wall structure.

13. A flexible inner pipe carcass of a flexible riser, flow line or jumper according to claim 12, characterized in that the insert profile is attached to one of the adjacent wall strips forming the tubular wall structure along at least a majority of its longitudinal extension.

14. A flexible inner pipe carcass of a flexible riser, flow line or jumper according to claim 12, characterized in that the insert profile is attached by means of welding or soldering.

15. A flexible inner pipe carcass of a flexible riser, flow line or jumper according to claim 12, characterized in that the insert profile is attached by a locking portion of the insert profile extending axially between the interlocking sections of the helically wound wall strip and cooperating with a groove in one of the adjacent wall strips.

16. A flexible inner pipe carcass of a flexible riser, flow line or jumper according to claim 1, characterized in that the insert profile forms a coiled spring expanded into contact with the tubular wall structure.

17. A flexible inner pipe carcass of a flexible riser, flow line or jumper according to claim 16, characterized in that the insert profile is attached to one of the adjacent wall strips forming the tubular wall structure at each of its ends.

* * * * *